Figure 1:
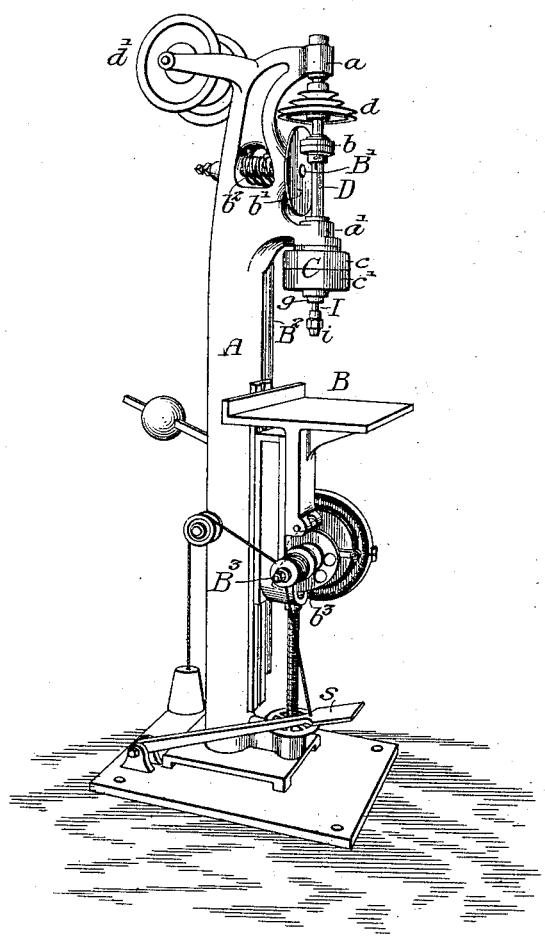

No. 701,143. Patented May 27, 1902.
J. W. BROWN, Jr.
TAPPING MACHINE.
(Application filed Apr. 30, 1900.)

(No Model.) 3 Sheets—Sheet 1.

Witnesses:-
Louis M. Y. Whitehead
Will. A. Barr.

Inventor:-
John Wilson Brown Jr.
by his Attorneys:-
Howson & Howson

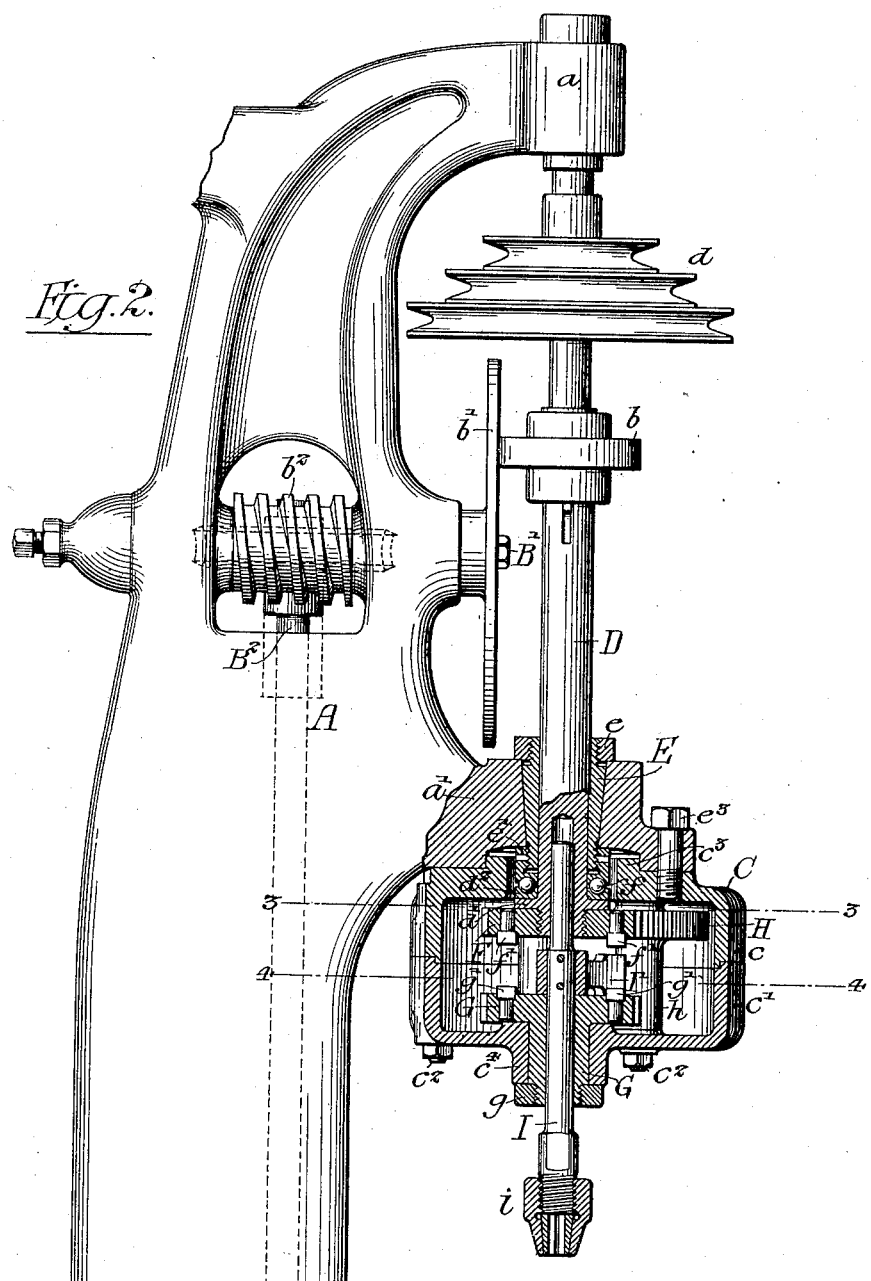

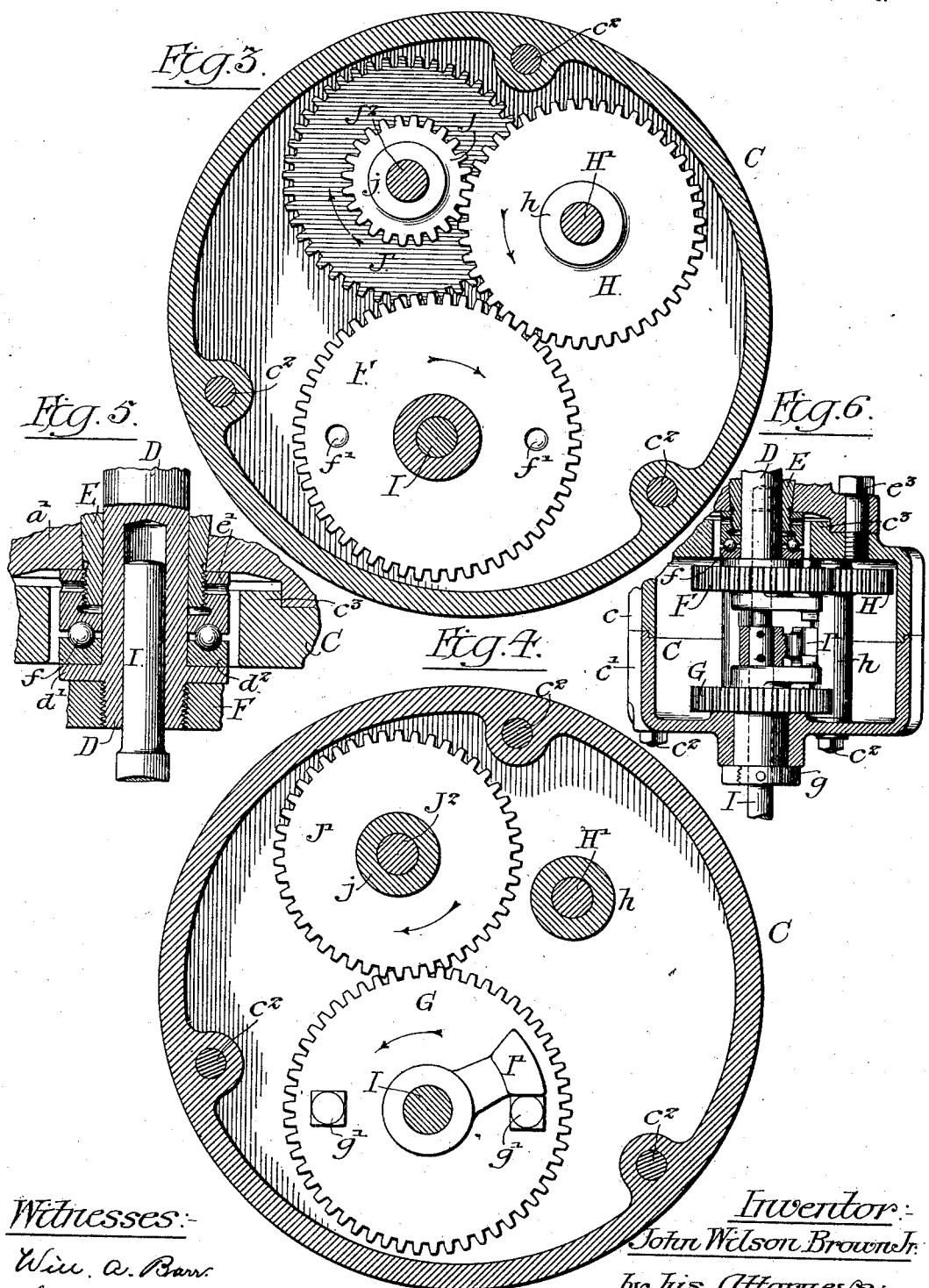

UNITED STATES PATENT OFFICE.

JOHN WILSON BROWN, JR., OF PHILADELPHIA, PENNSYLVANIA.

TAPPING-MACHINE.

SPECIFICATION forming part of Letters Patent No. 701,143, dated May 27, 1902.

Application filed April 30, 1900. Serial No. 14,979. (No model.)

*To all whom it may concern:*

Be it known that I, JOHN WILSON BROWN, Jr., a citizen of the United States, residing in Philadelphia, Pennsylvania, have invented certain Improvements in Tapping-Machines, of which the following is a specification.

My invention relates to certain improvements in automatic tapping-machines in which the work-holding table moves toward and from the tapping-head.

The object of my invention is to so construct such a machine that the tap-spindle will be clutched either to the forward feed-gear or to the reverse-gear by the action of the table through the medium of the work to be tapped.

In the accompanying drawings, Figure 1 is a perspective view of my improved tapping-machine. Fig. 2 is a side view, partly in section, of sufficient of the machine to illustrate the main features of my invention. Fig. 3 is an enlarged sectional plan view on the line 3 3, Fig. 2. Fig. 4 is an enlarged sectional plan view on the line 4 4, Fig. 2. Fig. 5 is a detailed sectional view of part of the machine shown in Fig. 2, and Fig. 6 is a view of a modification of the device.

Tapping-machines of this type are automatic to a certain extent—that is, the work is placed upon the table and the table is moved up to the tap, and as the table is fed gradually upward the tap is turned to cut the threads in the hole previously drilled, and when the table reaches a certain point its movement is reversed and it recedes, carrying the work with it, and in the meantime the movement of the tap is reversed, so that it will clear itself of the work. When the table reaches its lowest position, it is thrown out of gear and remains in this position until raised again by the operator after another piece of work is clamped to the table. One operator can attend to a number of machines of this type.

A is a standard, on which slides the table B, which can be operated in any suitable manner. One form of operating mechanism (shown in Fig. 1) is fully set forth and claimed in the patent granted to me on the 10th day of April, 1894, No. 518,176, and therefore need not be described in detail in this application.

D is a driven spindle having the cone belt-wheels $d$, around which the driving-bands pass from the guide-wheel $d'$.

$a$ is the upper bearing for the spindle D. The lower bearing for the said spindle is a tapered sleeve E, fitting a tapered opening in the bracket $a'$, extending from the standard A.

Motion is imparted to the table B through the friction-wheel $b$ on the spindle D and disk $b'$ on a shaft B', on which is a worm $b^2$, meshing with a worm-wheel on a vertical shaft $B^2$, geared to the shaft $B^3$, on which is the elevating-cam $b^3$ of the table, so that when the table B is raised by the operator depressing the treadle $s$ the mechanism of the table is thrown into gear with the shaft $B^2$ and the table will be gradually raised to a given point, to which it is set, and will then return and stop until again set in motion.

Referring again to the upper portion of the machine, the bearing-sleeve E for the spindle D has threaded projections at its upper and lower ends, and on these projections are nuts $e$ and $e'$, confining the sleeve to the bracket $a'$.

C is a casing made in two parts $c\, c'$, secured together by bolts $c^2$ and attached to the bracket $a$ by bolts $e^3$, as clearly illustrated in Fig. 2. The upper section $c$ of the casing has a projection $c^3$, which enters a cavity in the under side of the bracket $a'$ and centers the casing, so that it will be in line with the spindle D. The end of the spindle D has a flange $d'$, and mounted on this flange is a ring $d^2$, and between the ring and the nut $e'$ of the sleeve E are a series of antifriction-balls $f$, Fig. 5. The end $d^3$ of the spindle is threaded, and on this threaded portion of the spindle is a gear-wheel F, having lugs or projections $f'$, which in the present instance are driven into the gear-wheel, as clearly shown in Fig. 2.

Mounted in bearings $c^4$ in the lower section $c'$ of the casing C is a gear-wheel G, having a threaded end, on which is a nut $g$, which confines the gear-wheel to its bearing. On the gear-wheel are lugs or projections $g'$ similar to the lugs or projections $f'$ on the gear-wheel F.

The gear-wheels F and G are spaced a sufficient distance apart to allow for the free movement of a clutch-arm I', secured to a spindle I, having at its lower end a chuck $i$, to which is secured the tap. The spindle I fits snugly in the hub of the gear-wheel G, as well as in the opening in the end of the spindle D, and it will be noticed that there is sufficient space above the end of the spindle I to allow for its free upward movement. The space between the gears F and G is sufficient to allow the clutch-arm I' to play up and down, so as to be thrown either into the path of the lugs $f'$ on the gear F or into the path of the lugs $g'$ of the gear G, and I prefer to so space the gears that when in the mid-position the arm will be clear of the lugs on either gear. Other forms of clutch mechanism may be used without departing from my invention. The gear F is attached to the spindle D, and therefore revolves at the same speed; but the gear G is indirectly geared to the spindle and its direction of rotation is reversed and it revolves at a higher speed.

H is a gear-wheel meshing with the teeth of the gear-wheel F. This gear-wheel H has preferably a long hub $h$, mounted on a stud H', attached to both parts $c\ c'$ of the casing. The gear-wheel H in turn meshes with a pinion J, and mounted on the hub $j$ of this pinion is a gear-wheel J', meshing with the gear-wheel G. The hub $j$ is mounted on a stud $J^2$, also attached to both parts of the casing.

I prefer to arrange the gears as shown, so that the gear G will travel at a greater speed than the gear F, as it will be understood that when the clutch-arm I' is locked to the gear F the tap is threading a hole in the article as the table B is being fed upward, but when the arm I' is locked to the gear G the tap is simply being removed from the article without cutting as the table is lowered, and consequently can be driven at a greater speed than the gear F.

The gearing of the machine is such that the table will be fed during each revolution of the tap-spindle a distance substantially equal to the pitch of the tap, and the mechanism for controlling the movement of the tap is entirely automatic.

The operation of the machine is as follows: The article to be tapped, which has been previously drilled or reamed, is mounted in position on the table B and clamped thereto, and a tap of the proper size is secured in the chuck $i$. The table is then moved up into gear by depressing the treadle $s$, moving the work in contact with the tap, and as the table is lifted it will raise the spindle I and its clutch-arm I', so that the arm will be in the path of the lugs of the gear-wheel F. The tap will be driven at the proper speed, so as to cut the threads in the opening in the article carried by the table as the table feeds upward, the feed of the table being regulated according to the pitch of the threads of the tap and the speed at which the tap is driven. When the table reaches the full extent of its upward movement, it immediately descends, and as the table descends it carries the work with it and also the tap and the spindle I. The clutch-arm of the spindle will free itself from the lugs $f'$ of the gear-wheel F and will move into the path of the lugs $g'$ of the gear-wheel G, and the movement of the tap will then be reversed, and as the table descends the work will clear the tap and the table will stop until moved upward again by the operator. In some instances, while I prefer the construction shown in the drawings, I may use arms to engage the clutch and gear the lower arm to the spindle D, as shown in Fig. 6.

In the claims I have alluded to the gear-wheels F and G as elements, and the table may be either moved toward the tap and its driving mechanism, or the table may be stationary and the feeding movement imparted to the tapping mechanism, it being understood that one is the equivalent of the other, although I find in practice that imparting the movement to the table is preferable.

I claim as my invention—

1. The combination of a standard, a spindle, a bracket, a tapered opening in the bracket, a tapered sleeve in the opening and having nuts at either end, a flange on the end of the spindle, a ring mounted on the flange, balls mounted between the ring and the nut on the end of the tapered bearing, a two-part casing secured to the bracket, a gear-wheel F mounted on the end of the spindle and having one or more lugs, a gear-wheel G mounted on the lower section of the casing and also having one or more lugs, a gear-wheel G meshing with the gear-wheel F, a gear-wheel J meshing with the gear-wheel H, and a gear-wheel J' secured to the gear-wheel J and meshing with the gear-wheel G, a tap-spindle passing through the gear-wheel G and into an opening in the end of the driving-spindle, a clutch-arm on the end of the tap-spindle extending between the two gear-wheels F and G and arranged so as to be engaged by either the lugs on the wheel F or the lugs on the wheel G, substantially as described.

2. The combination in a tapping-machine of a frame having a bracket, a casing supported thereby, a driving-spindle extending into the casing and having a bearing in the bracket, a flange on the lower portion of the spindle and ball-bearings between said flange and the bracket, a gear-wheel on the spindle provided with lugs, a second gear-wheel in the casing below the first wheel and also having lugs, intermediate gearing whereby the second gear-wheel may be driven from the first wheel, a tapping-spindle and a projection on said spindle constructed to be engaged by the lugs of either gear-wheel, substantially as described.

3. The combination in a tapping-machine of a frame, a bracket projecting from said frame, a casing, a driving-shaft carried by the frame and extending into the casing, a sleeve carried by the bracket and surrounding said spindle, means for holding said sleeve stationary in the bracket, ball-bearings between the lower end of the spindle and said sleeve, a gear-wheel fixed to the lower end of the spindle having projecting lugs, a second gear-wheel in the casing below the first wheel and also having lugs, intermediate gearing whereby the second gear-wheel may be driven from the first wheel, a tapping-spindle and a projection on said spindle constructed to be engaged by the lugs of either gear-wheel, substantially as described.

In testimony whereof I have signed my name to this specification in the presence of two subscribing witnesses.

JOHN WILSON BROWN, JR.

Witnesses:
WILL. A. BARR,
JOS. H. KLEIN.